United States Patent [19]

Iijima

[11] Patent Number: 5,515,532
[45] Date of Patent: May 7, 1996

[54] FILE MANAGEMENT SYSTEM FOR MEMORY CARD

[75] Inventor: Yasuo Iijima, Yokohama, Japan

[73] Assignee: Kabushiki Kaisha Toshiba, Kawasaki, Japan

[21] Appl. No.: 309,598

[22] Filed: Sep. 21, 1994

[30] Foreign Application Priority Data

Sep. 22, 1993 [JP] Japan ........................... 5-259267

[51] Int. Cl.⁶ ........................... G06F 13/00; G06G 15/40
[52] U.S. Cl. .............. 395/600; 395/700; 395/183.14; 364/963; 364/966.1; 364/DIG. 2
[58] Field of Search ........................... 395/600, 575, 395/700, 275, 250

[56] References Cited

U.S. PATENT DOCUMENTS

| | | | |
|---|---|---|---|
| 4,575,827 | 3/1986 | Kulakowski | 395/230 |
| 4,791,623 | 12/1988 | Deiotte | 369/59 |
| 4,827,462 | 5/1989 | Flannagan et al. | 369/32 |
| 4,829,169 | 5/1989 | Watanabe | 235/492 |
| 4,855,578 | 8/1989 | Hirokawa et al. | 235/380 |
| 4,965,802 | 10/1990 | Shinagawa | 371/51.1 |
| 5,047,918 | 9/1991 | Schwartz et al. | 395/600 |
| 5,093,779 | 3/1992 | Sakurai | 395/600 |
| 5,132,954 | 7/1992 | Kulakowski et al. | 369/32 |
| 5,226,155 | 7/1993 | Iijima | 395/600 |
| 5,237,682 | 8/1993 | Bendert | 395/600 |
| 5,252,812 | 10/1993 | Nakamura | 395/425 |
| 5,379,262 | 1/1995 | Okamoto et al. | 365/230.01 |

*Primary Examiner*—Thomas G. Black
*Assistant Examiner*—C. Pham
*Attorney, Agent, or Firm*—Cushman, Darby & Cushman

[57] ABSTRACT

In a file management system for an IC card, which divides a data memory into a plurality of files, and performs data management of the divided files, a directory for managing the files is divided into field length fields, file definition information is stored in each of the divided fields, and information for specifying the file definition information is assigned to each of the divided fields.

5 Claims, 11 Drawing Sheets

DATA FILE NAME (TOTAL 19 BYTES)

| PTN | DFSN | DFID | NL | DF name | DMY | BCC2 |
|-----|------|------|----|---------|-----|------|
| 1 | 1 | 2 | 1 | 1 TO 8 (BYTES) | 5 TO 12 | 1 |

DATA FILE MANAGEMENT INFO.

| PTN | DFSN | PFSN | DFS | AAID | TYPE | DFAC | BCC1 | DFST | US | BCC2 |
|-----|------|------|-----|------|------|------|------|------|----|----|
| 1 | 1 | 1 | 2 | 1 | 1 | 6 | 1 | 2 | 2 | 1 |

DATA AREA INFO.

| PTN | DFSN | AID | ATOP | ASIZ | AAC | DMY | BCC1 | AST | BCC2 |
|-----|------|-----|------|------|-----|-----|------|-----|------|
| 1 | 1 | 1 | 2 | 2 | 6 | 2 | 1 | 2 | 1 |

KEY AREA INFO.

| PTN | DFSN | KID | KTOP | KSIZ | BS | KAC | DMY | BCC1 | KST | BCC2 |
|-----|------|-----|------|------|----|----|-----|------|-----|------|
| 1 | 1 | 1 | 2 | 1 | 1 | 6 | 2 | 1 | 2 | 1 |

| DFSN | | |
|---|---|---|
| #1 | 01 | DEFINITION WORD (00) OF DF1 |
| #2 | 01 | DEFINITION WORD OF KEY AREA 1 |
| #3 | 01 | DEFINITION WORD OF DATA AREA 1 |
| #4 | 02 | DEFINITION WORD (00) OF DF2 |
| #5 | 02 | DEFINITION WORD OF KEY AREA 2 |
| #6 | 01 | DEFINITION WORD OF KEY AREA 3 |
| #7 | 00 | DEFINITION WORD OF KEY AREA 4 |
| #8 | 03 | DEFINITION WORD (02) OF DF3 |
| #9 | 03 | DEFINITION WORD OF KEY AREA 5 |
| #10 | 04 | DEFINITION WORD (02) OF DF4 |
| #11 | 04 | DEFINITION WORD OF KEY AREA 6 |
| #12 | 01 | DEFINITION WORD OF DATA AREA 2 |
F I G. 5
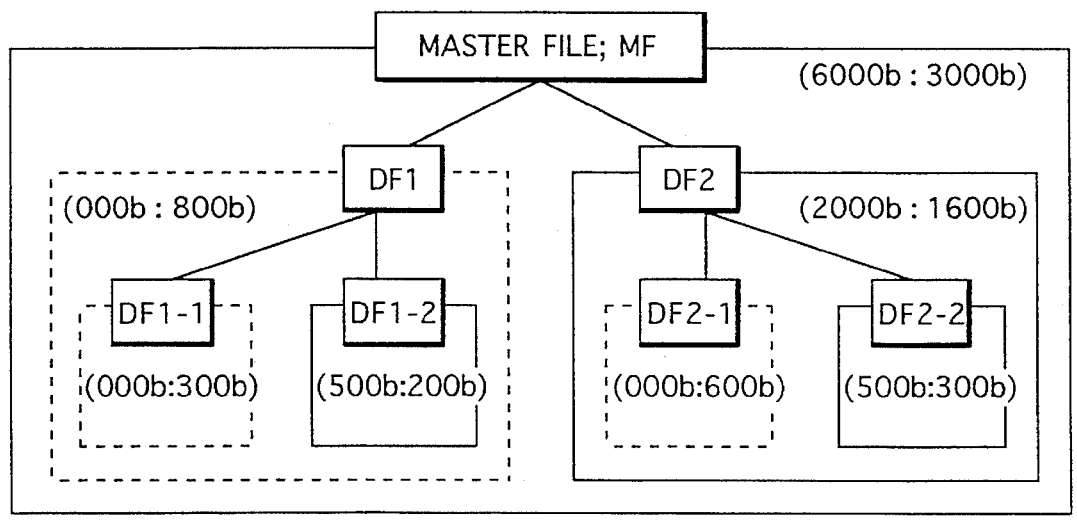
F I G. 6    (ASSIGNED DATA BYTES : USED DATA BYTES)

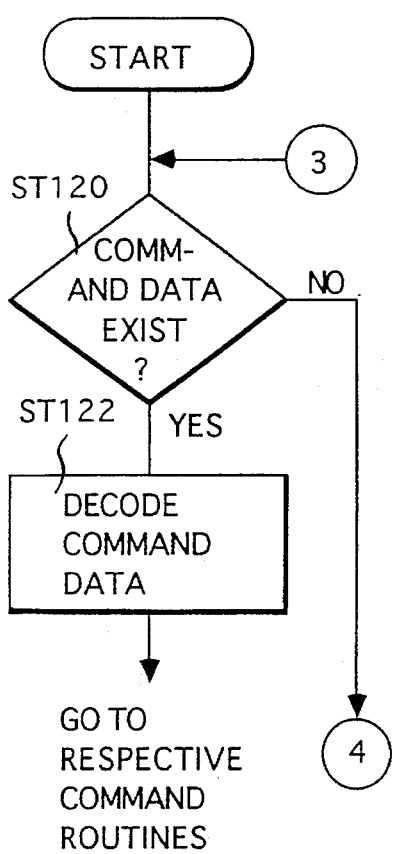
FIG. 7A
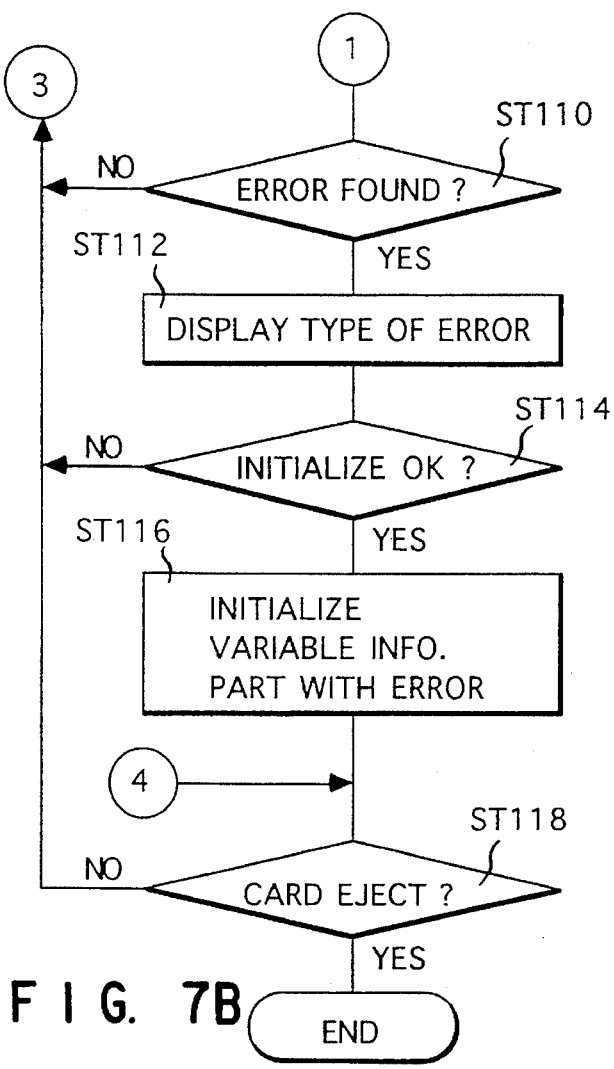
FIG. 7B
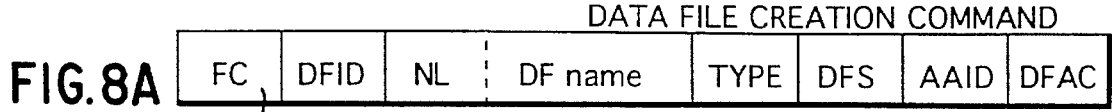
FIG. 8A  DATA FILE CREATION COMMAND
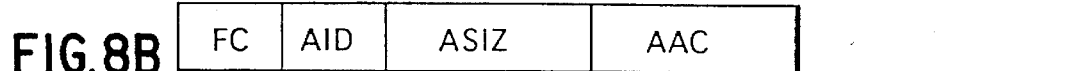
FIG. 8B  DATA AREA CREATION COMMAND
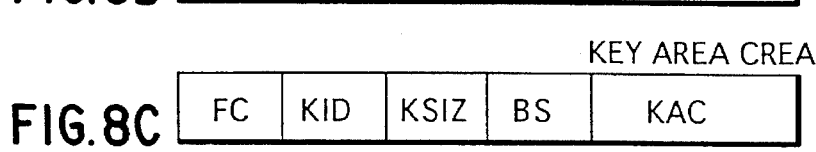
FIG. 8C  KEY AREA CREATION COMMAND

RECORD WRITING COMMAND

FIG. 14A | FC | ID | WRITE DATA |

FUNCTION CODE

FIG. 14B | FC | ID | RN | RECORD READING COMMAND

RECORD NUMBER

FIG. 14C | FC | ID | RN | RECORD ERASING COMMAND

KEY IDENFITICATION COMMAND

FIG. 14D | FC | ID | KEY DATA FOR IDENTIFY |

FIG. 14E | FC | ID | KEY UNLOCK COMMAND

FILE MANAGEMENT SYSTEM FOR MEMORY CARD

BACKGROUND OF THE INVENTION

1. Field of the Invention

The present invention relates to a file management system for performing data management of a plurality of files divisionally set in nonvolatile memories in an IC card which incorporates an IC chip having the nonvolatile memories and a control element for controlling these memories.

2. Description of the Related Art

In recent years, as a portable data storage medium, an IC card which incorporates an IC chip having a nonvolatile data memory and a control element (CPU) for controlling the memory has been receiving a lot of attention.

In an IC card of this type, an internal data memory is divided into a plurality of files. Each file stores data necessary for execution of a software application for the IC card, an identification number, and other information. By inputting an application identification name from an external device (terminal), a corresponding file in the IC card is selectively set in a useable state. For this reason, a plurality of application data are divided into files, and are stored in a single IC card, thus realizing multiple-purpose utilizations.

A plurality of data files for storing data such as transaction data, and a key file for storing key data can belong to each of these application files.

The data files, data areas, and key areas are managed by the internal CPU of the IC card. U.S. Pat. No. 5,226,155 patented on Jul. 6, 1993 (Iijima) discloses such an IC card. In this case, in order to recognize position attributes of the files and areas by the CPU, definition information of each of these files and areas may be stored and managed in a directory in the IC card.

In this case, the data files, data areas, and key areas have different types of attributes such as position information and different data formats. Assume that a plurality of pieces of management information are stored in turn in a directory. If length information (the length information, an actual data length, or given identification information which is recognized as a length by the CPU may be used) is added to each definition, specific definition information can be searched for on the basis of the added information.

However, with this method, if definition information near the head of the directory is destroyed, the following definition information (at lower hierarchical levels) cannot be searched.

Data which is updated as needed upon operation of a card such as pointer information which indicates an information (record) position to be managed in the directory may be destroyed by, e.g., illegal removal of the card. In this case, if an access to a file indicated by the destroyed pointer can no longer be made, the operation of the entire card system is disturbed.

SUMMARY OF THE INVENTION

It is the first object of the present invention to provide a file management system for a memory card which can improve reliability by allowing access to other definition information in the card even if a directory in the card is locally damaged or destroyed.

It is the second object of the present invention to provide a file management system for a memory card, which can assure authenticity of fixed information in the card even when variable information in the card is damaged or destroyed due to accidental removal of the card.

It is the third object of the present invention to provide a file management system for a memory card, which can correct damaged or destroyed variable information even when an unexpected accident occurs in a variable information part in the card, and which can assure a normal operation of the card after the accident.

According to the first object of the present invention, a file management system is used in which a memory is divided into a plurality of files and data management of the divided files is performed. The file management system comprises dividing means for dividing a directory for managing the files into fixed fields, definition information storage means for storing file definition information in each of the fixed fields divided by the dividing means, and means for assigning information for specifying the file definition information at the head (or leading part) of each of the fixed fields divided by the dividing means.

According to the second object of the present invention, a file management system in which a memory is divided into a plurality of files and data management of the divided files is performed, comprises storage means for storing fixed information and variable information of the files, and means for rejecting an access to the fixed information depending on a type of an access to the files.

According to the third object of the present invention, a file management system is used in which a memory is divided into a plurality of files and data management of the divided files is performed. The file management system comprises storage means for storing fixed information and variable information of the files, another storage means for storing information for confirming the authenticity of the variable information, authenticity confirming means for confirming the authenticity of the variable information on the basis of the information stored in the other storage means, and initializing means for initializing the variable information whose authenticity is not confirmed (or verified) by the authenticity confirming means, and initializing the corresponding information for confirming the authenticity in the other storage means.

According to the present invention, since data in a directory can be managed based on fixed lengths (or sizes), a local destruction to the directory does not influence accesses to other non-destroyed definition information, and reliability of the system can be remarkably improved.

If fixed information in a directory is allowed to become an access target in only creation of files, the authenticity of the fixed information can be assured even when variable information is damaged or destroyed by, e.g., unexpected removal of the card upon changing of variable information.

Furthermore, even when the unexpected accident takes place, in particular, since a variable information part can be corrected (or initialized), the normal operation of the IC card after the accident can be assured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a map showing the configuration of a directory set in the data memory;

FIG. 6 shows a hierarchical structure of the directory for explaining an example of mixing of data files with and without size management;

FIGS. 7A and 7B are flow charts for explaining a command data input routine;

FIGS. 8A to 8C show the formats of file or area creation commands;

FIGS. 14A to 14E show the formats of various access commands;

DETAILED DESCRIPTION OF THE PREFERRED EMBODIMENTS

A memory card handling apparatus utilizing a file management system according to an embodiment of the present invention will be described below with reference to the accompanying drawings.

Figure 1:
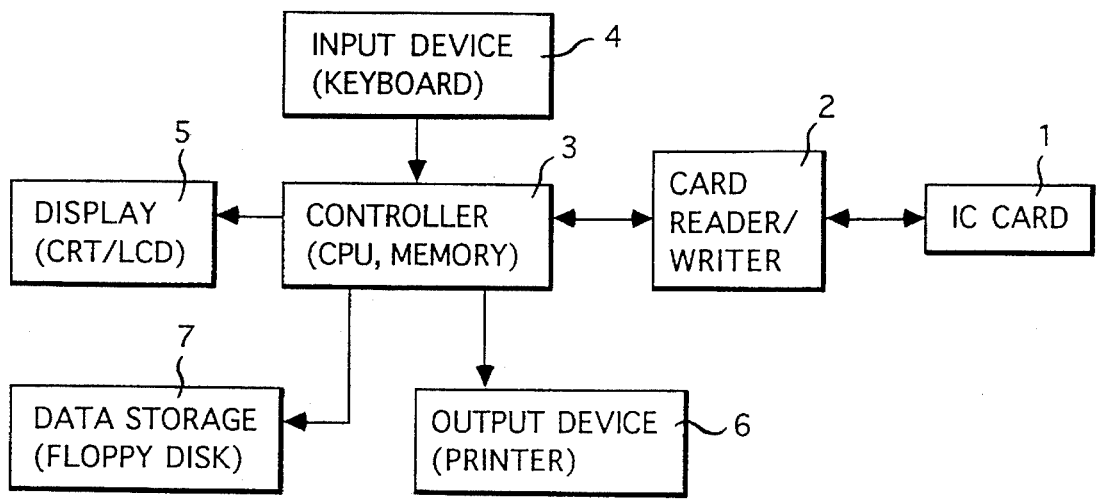
FIG. 1 is a block diagram showing the arrangement of a card handling apparatus to which an IC card according to an embodiment of the present invention is applied.

FIG. 1 shows the arrangement of a card handling apparatus (e.g., a terminal apparatus for a banking system, a shopping system, or the like) to which an IC card as a portable memory card is applied. In this apparatus, IC card 1 can be connected to controller 3 comprising, e.g., a CPU, a memory, and other elements via card reader/writer 2. Controller 3 is connected to keyboard 4, CRT (or liquid crystal) display 5, printer 6, and floppy disk 7.

Figure 2:
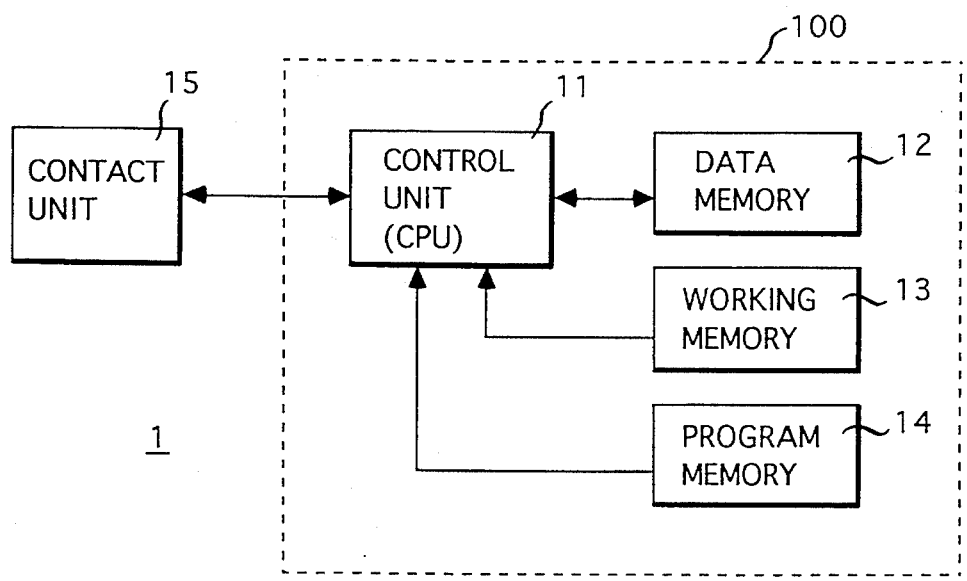
FIG. 2 is a block diagram showing the arrangement of the IC card.

FIG. 2 shows the internal arrangement of IC card 1. IC card 1 comprises control unit (CPU) 11, nonvolatile data memory (EEPROM) 12 whose storage contents are erasable, working memory (RAM) 13, program memory (ROM) 14, and contact unit 15 for achieving electrical contacts with card reader/writer 2. Of these components, components (CPU 11, data memory 12, working memory 13, and program memory 14) are surrounded by a broken line are constituted by one (or a plurality of) IC chip 100, and the IC chip is embedded in the main body of IC card 1.

Data memory 12 is used for storing various data, and comprises, e.g., an EEPROM. Working memory 13 is a memory for temporarily holding processed data upon execution of processing by CPU 11, and comprises, e.g., a CMOS RAM. Program memory 14 comprises, e.g., a mask ROM, and stores programs for CPU 11.

Figures 3, 4A, 4B, 4C, 4D:
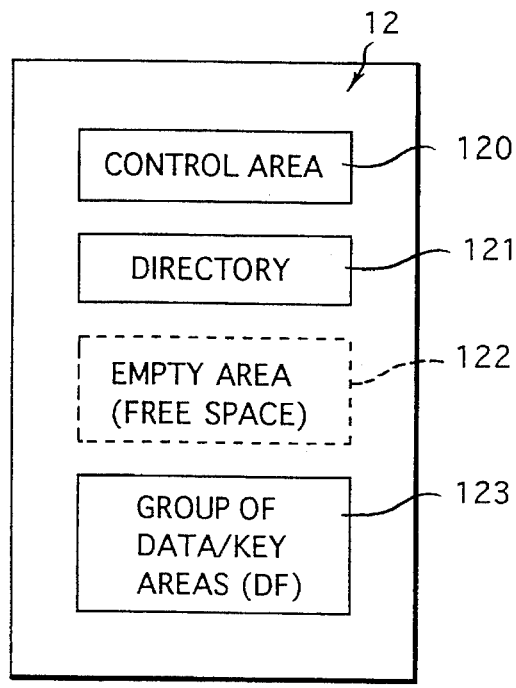
FIG. 3 is a memory map showing the configuration of a data memory.
FIGS. 4A to 4D show the formats of various kinds of definition information.

Data memory 12 is divided into control area 120, directory 121, empty area 122, and area group 123, as shown in, e.g., FIG. 3. Area group 123 can have a plurality of data and key areas, and can be grouped by a concept called a data file (DF). Note that an MF (master file; to be described later) is simultaneously managed as one type of data files.

A data file is a file for simultaneously managing data areas used by corresponding applications, and key areas.

A data area is an area for storing data such as transaction data, which is read/written as needed.

A key area is an area utilized to store, e.g., an identification number, and the like, and serves as a writing/rewriting/identifying target. Therefore, data cannot be read out from this area.

These areas are simultaneously assigned to a predetermined address of memory 12 as area group 123, as shown in FIG. 3. The physical locations (defined by full-pass names from an MF in a root directory level) of these files or areas are recognized by CPU 11 using directory 121 in data memory 12.

Furthermore, control area 120 in FIG. 3 stores leading address information of area group 123, and leading address information of empty area 122.

Directory 121 shown in FIG. 3 stores various kinds of definition information corresponding to data files and areas, as shown in FIGS. 4A to 4D.

FIG. 4A shows information for defining the name of a data file. This definition information consists of data PTN for identifying data file name definition information in directory 121, file sequence number DFSN assigned to this data file, data DFID for identifying this data file, file name DFname assigned to this data file, data NL indicating the length of the assigned file name, dummy data DMY for maintaining a fixed or constant length (19 bytes) of the data shown in FIG. 4A, and data BCC2 for checking authenticity of these data. Dummy data DMY for maintaining a constant length (19 bytes) is inserted by CPU 11 upon preparation of the definition information field shown in FIG. 4A.

FIG. 4B shows information for defining management information of a data file. This definition information consists of data PTN for identifying data file name definition information in directory 121, file sequence number DFSN assigned to this data file, sequence number PFSN of a parent file of this data file, data DFS indicating the size of this data file, data AAID for identifying a data area for storing addition information of this data file, data TYPE for defining whether or not the addition information is output, data DFAC representing an access condition of the data file, data BCC1 for checking authenticity of the above-mentioned data, data DFST for holding the status of this data file, byte count US used by data files and areas under (in lower directory levels of) this data file, and data BCC2 for checking authenticity of all these data.

In FIG. 4B, since a total of 19 bytes are used, dummy data DMY for maintaining a fixed length of 19 bytes is omitted.

In particular, data AAID is utilized to output the contents of a data area indicated by data AAID when a data file is selected using a data file selection command (to be described later).

Note that the MF (master file) has no data file name definition information since there is only one MF.

FIG. 4C shows information for defining an area for storing various transaction data. This definition information consists of data PTN for identifying area definition information in directory 121, sequence number DFSN of a data file to which this area belongs, identification (ID) number AID used upon access to the area, data ATOP indicating the leading address of the area, data ASIZ indicating the area size, data AAC representing an access condition to the area, dummy data DMY for maintaining the fixed length (19 bytes), data BCC1 for checking authenticity of the above-mentioned data, data AST for holding the status of the area, and data BCC2 for checking authenticity of all these data.

FIG. 4D shows information for defining an area for storing various key data. The definition information consists of data PTN for identifying key area definition information in directory 121, sequence number DFSN of a data file to which this area belongs, ID number KID used upon access to the area, data KTOP indicating the leading address of the area, data KSIZ indicating the area size, identification bit BS used for identifying the key status, data KAC representing an access condition of the key, dummy data DMY for maintaining the fixed length (19 bytes), data BCC1 for checking authenticity of the above-mentioned data, data KST for holding the status of the key, and data BCC2 for checking authenticity of all these data.

ID information PTN used in these pieces of information consists of 1 byte, and '00' is used as information (FIG. 4A) for defining the name of a data file; '01', information (FIG. 4B) for defining management information of a data file; '02', information (FIG. 4C) for defining a data area; and '03', information (FIG. 4D) for defining a key area.

Note that each definition information group consists of the same number of bytes (19-byte fixed length). A numeral in parentheses added to each field in FIGS. 4A to 4D indicates the number of bytes constituting the corresponding field. As shown in FIGS. 4A to 4D, all the pieces of definition information have a 19-byte configuration, and the lengths of these information are adjusted to a fixed length (constant length) of 19 bytes by inserting dummy data as needed. Therefore, when 1-byte data, i.e., data PTN, is extracted at 19-byte intervals from the beginning of the directory, only definition information in units of configuration types (data file/data area/key area) can be searched for as a target.

These pieces of definition information are simultaneously stored in directory 121, as shown in FIG. 5. In FIG. 5, for the sake of descriptive convenience, data DFSN of various definition words are listed in the leftmost column, and in particular, in data file definition words (FIG. 4B), data PFSN are represented by numerals in parentheses.

As shown in FIG. 5, data DFSN (file sequence number) is automatically assigned to each definition information upon creation of a file. CPU 11 recognizes the association states of files on the basis of data DFSN and a sequence number (#1 to #12) of a parent file stored in data file definition information.

For example, key area 3 defined by key area definition information stored in the sixth row (#6) in FIG. 5 has data DFSN='01'. A data file definition word having '01' as data DFSN is a DF1 (data file 1) definition word. Therefore, as can be understood from the above description, key area 3 belongs to DF1.

Similarly, key area 6 defined by key area definition information stored in the 11th row (#11) in FIG. 5 is placed under DF4. Furthermore, data PFSN in DF4 definition information is '02'. A data file definition word having '02' as data DFSN is a DF2 (data file 2) definition word. Therefore, as can be understood from the above description, DF4 is a data file placed under DF2.

Size information is assigned to each of these data files, and indicates the upper limit value of the total size of data files placed under the corresponding data file. The size information (ASIZ in FIG. 4C) is 2-byte information. When the size information is '0000', it is recognized that no upper limit value is defined in the corresponding data file.

FIG. 6 shows an example of mixing of data files with and without size management. In FIG. 6, a box indicated by a solid line includes data files (fixed length data) for which size management is instructed, and these data files respectively have illustrated byte counts as their sizes. Also, a box indicated by a broken line includes data files (variable data) for which size management is not instructed. As shown in FIG. 6, a size value is designated for a data file to be subjected to size management using a file creation command (to be described later). However, when size management is not performed, the designated size value (ASIZ) is set to be '0000'.

FIG. 6 illustrates the master file (MF) size as (6000b: 3000b). This indicates that the MF size available for a primary issuer is 6,000 bytes, and the total size of files immediately under the MF and their followers is 3,000 bytes. In particular, the total of area sizes immediately under each file is given by (the number of bytes used by the corresponding file)–(the total number of bytes used by data files placed under the file).

For example, the number of bytes used by DF1 is 800 bytes, the number of bytes used by DF2 (since a size is assigned in advance to DF2, the number of assigned bytes corresponds to the number of used bytes when viewed from the MF) is 2,000 bytes. Therefore, it is recognized that the total number of bytes used by areas placed under the MF (i.e., the areas used by the MF itself) is 200 (=3000–2800) bytes.

Similarly, it is recognized that the total number of bytes used by areas immediately under DF1 is 100 (=800–700) bytes, and the number of bytes used by areas immediately under DF2 is 500 (=1600–1100) bytes.

File size management is to execute control to create a data file or area under a given data file within a range of the size assigned to the data file.

In FIG. 6, when a data file or area is created in each file, the remaining size is recognized by the following correspondences.

(1) When area or DF is created immediately under MF:
(MF size) – (used size as MF) = 6,000 – 3,000 = 3,000 bytes
(2) When area or DF is created immediately under DF1:
(MF size) – (used size as MF) = 3,000 bytes
(3) When area is created immediately under DF1-1:
(MF size) – (used size as MF) = 3,000 bytes
(4) When area is created immediately under DF1-2:
(DF1-2 size) – (used size as DF1-02) = 500 – 200 = 300 bytes
(5) When area or DF is created immediately under DF2:
(DF2 size) – (used size as DF2) = 1,600 – 1,100 = 500 bytes
(6) When area is created immediately under DF2-1:
(DF2 size) – (used size as DF2) = 500 bytes
(7) When area is created immediately under DF2-2:
(DF2-2 size) – (used size as DF2-2) = 500 – 300 = 200 bytes More specifically, when a subordinate file or area is created in a given file, "unused size C" can be calculated on the basis of "assigned size A" and "used size B" which are found in an upper directory level including the file and are managed by a file that performs size management.

For example, in FIG. 6, when MF, DF1, or DF1-1 is a current file, the assigned size (6,000 bytes) of master file MF corresponds to "assigned size A". When DF1-2 is a current file, the assigned size (500 bytes) of data file DF1-2 itself corresponds to "assigned size A". When DF2 or DF2-1 is a current file, the assigned size (1,600 bytes) of data file DF2 corresponds to "assigned size A". When DF2-2 is a current file, the assigned size (500 bytes) of data file DF2-2 itself corresponds to "assigned size A".

When "assigned size A" is calculated, and "used size B" is calculated from the total used size under (in a lower directory level of) a file of interest to which "assigned size A" is assigned, "unused size C" is calculated by:

$$\text{"Assigned Size } A\text{"}-\text{"Used Size } B\text{"}=\text{"Unused Size } C\text{"} \quad (1)$$

The principle of the operation of IC card 1 will be described below with reference to the flow chart in FIG. 7A and 7B. Here, the processing of FIG. 7A is executed in IC card 1, while that of FIG. 7B is executed in the card handling apparatus of FIG. 1.

When IC card 1 in FIG. 1 is inserted into reader/writer 2, it is electrically activated, and then waits for input of command data (command). At this time, CPU 11 of card 1 waits for command data from controller 3. When a command is input (YES in step ST120), CPU 11 extracts and decodes a function code located at the head of command data, and goes to a corresponding command routine. Thereafter, CPU 11 executes processing in the command routine, and outputs the processing result. Thereafter, CPU 11 waits for input of command data (START position in FIG. 7A).

As a result of execution of various kinds of processing to be described later with reference to FIG. 9, etc., if processing is completed successfully without any error (NO in step ST110), CPU 11 returns to a wait state of command data (command).

As a result of execution of various kinds of processing to be described later, if an error is found (YES in step ST110 in FIG. 7B), the type of error (step ST14, ST20, ST26, or ST36 in FIG. 9; step ST46 in FIG. 10; step ST66, ST72, ST76, or ST80 in FIG. 11; step ST94 or ST102 in FIG. 13; or step ST194 or ST202 in FIG. 16) is displayed on display 5 in FIG. 1 by the processing of controller 3 in FIG. 1 (step ST112).

Of the types of error displayed on display 5, if an error occurs in a variable information part of card 1 (step ST102 in FIG. 13 or step ST202 in FIG. 16), the file (or area) where the error has occurred can be initialized upon operation of keyboard 4 by a card user.

More specifically, if the variable part of the definition information is not verified (NO in step ST101 in FIG. 13), the IC card outputs response data meaning that the variable information part is abnormal (step ST102).

Note that the above response (step ST102) from the IC card does not always mean that the data in the area defined by the non-verified definition information (variable information) is abnormal or damaged. Rather, this response (step ST102) indicates that the variable definition information (not data contained therein) is not verified and thus abnormal.

However, it is unknown from the above response which part of the data contained in the area defined by the non-verified (abnormal) definition information is normal or effective.

For this reason, if the above response is output from the IC card, the card user can optionally (or selectively) erase (or initialize) all records in the area defined by the non-verified definition information.

When the card user selects the initialization using input device 4 (FIG. 1), card reader/writer 2 sends an "erase all" command to IC card 1 (step ST98, YES). Then, CPU 11 of IC card 1 erases (step ST104) all records of the area defined by the non-verified definition information.

After all of the records are erased, the pointer information (corresponding AST in FIG. 4C or KST in FIG. 4D) is initialized, and the corresponding binary check code (BCC2) is renewed.

In this embodiment, whether or not the error-occurred file (or area) is initialized is determined by a user of card 1. More specifically, when the user of card 1 determines to initialize the error part and selects an initializing operation via keyboard 4 (or a touch panel arranged on display 5) (YES in step ST114), the error-occurred file (or area) is initialized (step ST116). With this operation, the file in the area where the error has occurred is restored to an original state, and that part can be normally used again.

Thereafter, when card 1 is removed from reader/writer 2 in FIG. 1 (YES in step ST118), processing for card 1 ends. When card 1 is not removed from reader/writer 2 in FIG. 1 (NO in step ST118), the control returns to a wait state of command data (command) (i.e., the state immediately after start).

If the type of error displayed on display 5 is not an error of the variable information part, initialization by the user of card 1 is not performed (NO in step ST114), and the control returns to a wait state of command data (command) (i.e., the state immediately after start).

Note that processing operations in steps ST110 to ST118 in FIG. 7B are executed by controller 3 of the apparatus (terminal apparatus for handling IC card 1) shown in FIG. 1, and processing operations in steps ST120 to ST122 in FIG. 7A are executed by internal CPU 11 of IC card 1 shown in FIG. 2, which is inserted in the terminal apparatus shown in FIG. 1. Also, processing routines shown in the flow charts in FIGS. 9 to 11, 13, and 16 are executed by internal CPU 11 of IC card 1.

FIG. 8A exemplifies a data file creation command, FIG. 8B exemplifies a data area creation command, and FIG. 8C exemplifies a key area creation command. Note that the meanings of abbreviations (DFID and the like in FIGS. 8A to 8C are the same as those in FIGS. 4A to 4D.

Figure 9:
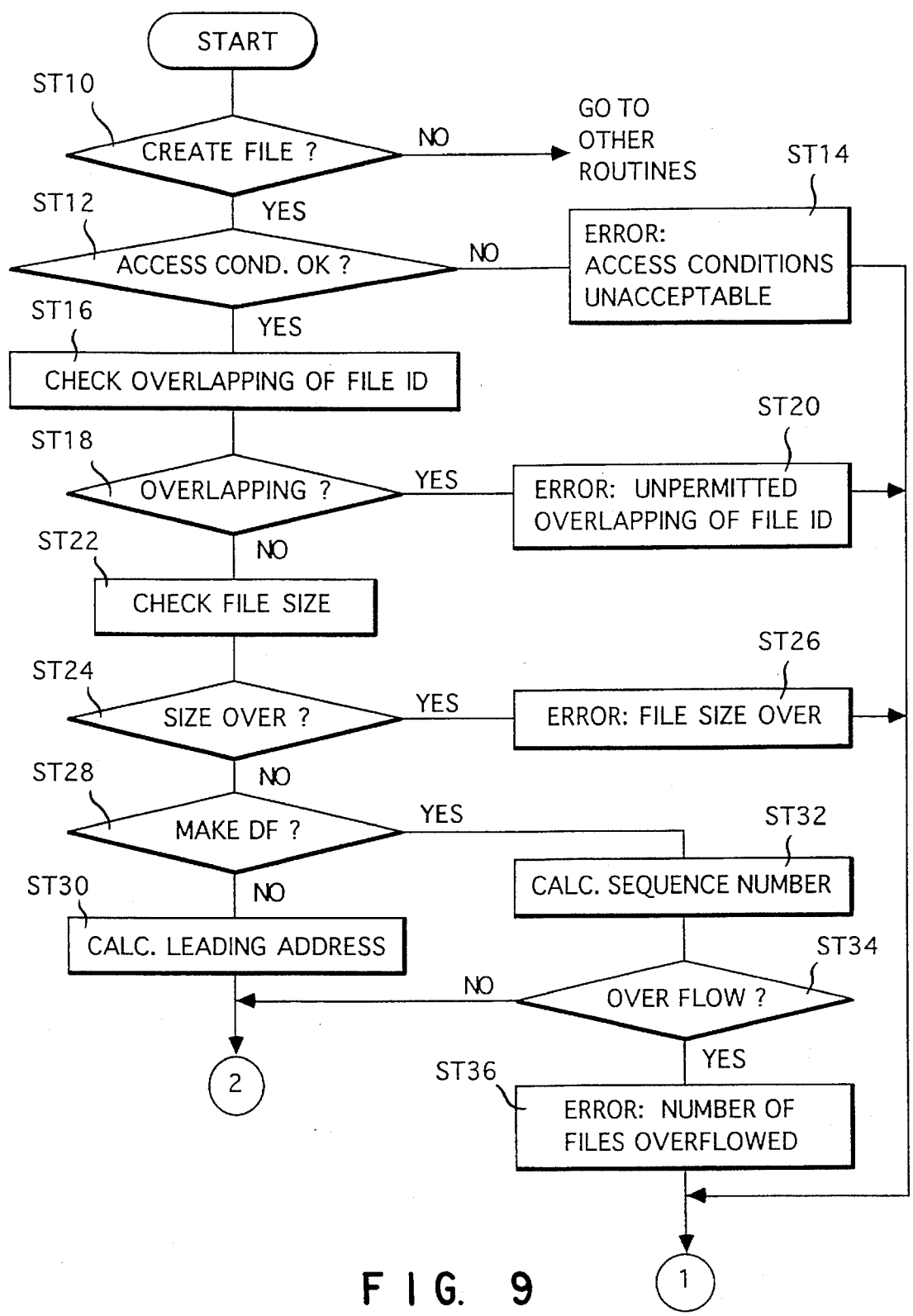
FIG. 9 is a flow chart for explaining a file/area creation operation.
Figure 10:
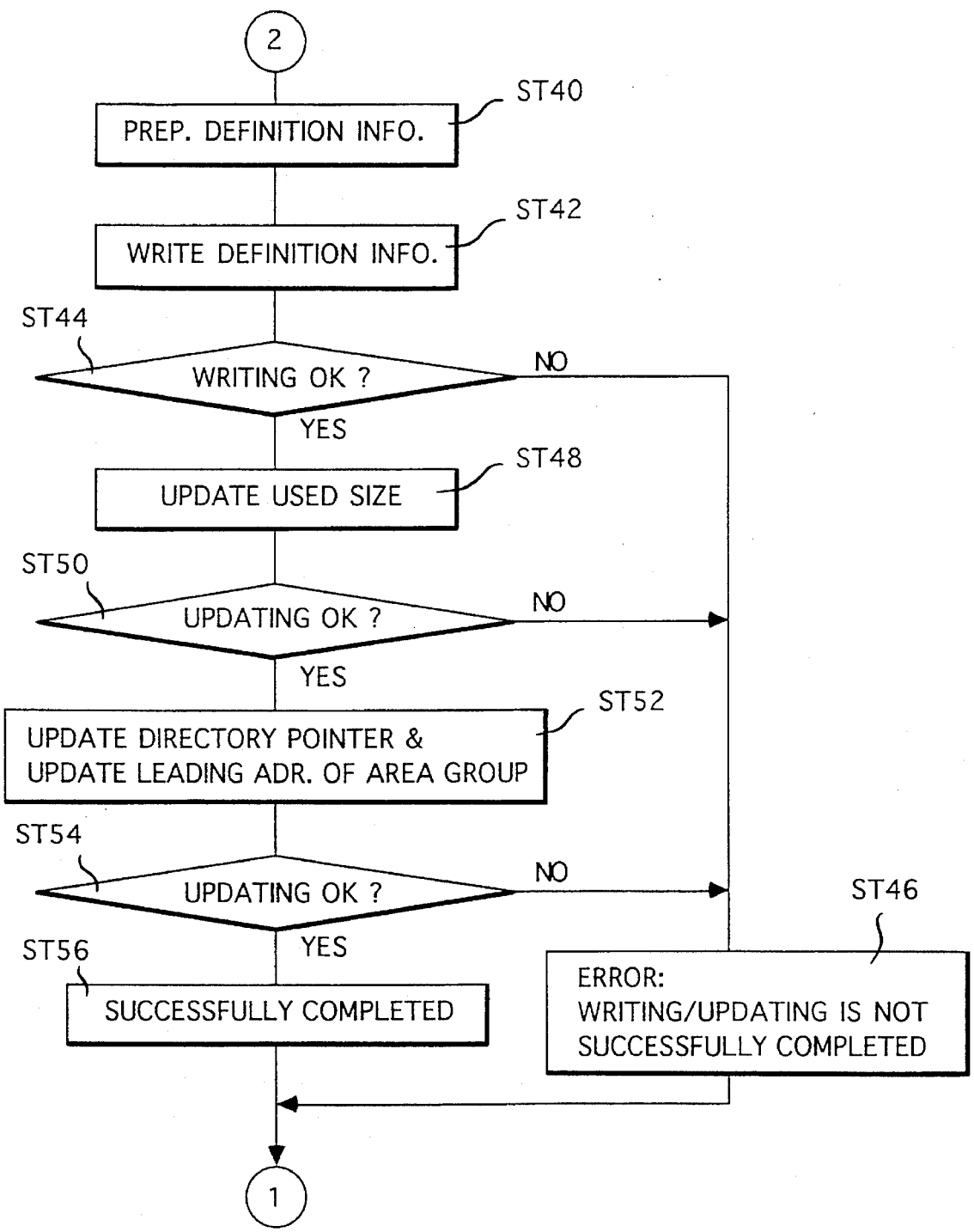
FIG. 10 is a flow chart for explaining the file/area creation operation.

FIGS. 9 and 10 are flow charts for explaining a file creation operation. Upon reception of a command statement shown in FIG. 8A, IC card 1 determines based on function code FC in this statement that the received command is a file creation command (YES in step ST10), and executes processing for creating a new directory according to the flow charts shown in FIGS. 9 and 10.

Whether or not a command execution condition is satisfied is checked based on identification status (DFID) and an access condition (DFAC) defined in a current file. If it is determined that the access condition is unacceptable (NO in step ST12), response data indicating an access condition error is output (step ST14), and the control returns to a command wait state (START in FIG. 7A) after processing in steps ST110 to ST118 in FIG. 7B.

When it is determined that the access condition is acceptable (YES in step ST12), it is then checked to determine whether the assigned ID (identification information DFID) designated by the command already exists in the current data file (step ST16). If the assigned ID already exists (YES in step ST18), response data indicating an ID overlapping error is output (step ST20), and the control returns to a command wait state (START in FIG. 7A). Otherwise (NO in step ST18), the flow advances to the next step.

When a command checked in step ST10 is a data file creation command, it is checked, in addition to this checking operation, if a data file name designated by the command already exists in IC card 1 (step ST16). If the same data file name already exists, response data indicating an ID overlapping error is output (step ST20) even if overlapping of DFID is not found, and the control returns to a command wait state (START in FIG. 7A).

It is checked in step ST22 if the file size designated by the command is authentic. At this time, when the received command is a data file creation command and the designated file size (DFS) is '0000', the number of bytes used by data file definition information (FIG. 4A) prepared by the command is checked; otherwise, a total number of bytes used by definition information prepared to have the designated file size (DFS) is checked.

At this time, the file size of the current data file is checked, and when the file size is other than '0000', an unused size (C) is calculated from the file size (A) defined by this current data file definition information and the used size (B) (see equation (1) above).

When the file size of the current data file is '0000', the file size of a parent file of the data file is looked up, and a similar checking operation is performed. In this manner, the unused size is finally calculated from the file size defined by the definition information of a file having a value other than '0000' as a file size, and the used size.

For example, when a file is created under DF1-1 in FIG. 6, since the size of this file (DF1-1) is '0000', the size of a file having a size other than '0000' of those (DF1 and MF) placed in upper directory levels, i.e., the size of the master file (MF) in FIG. 6, is checked in step ST22. Then, empty size C (3,000 bytes) is calculated from file size A (6,000 bytes) of the master file and used size B (3,000 bytes).

File empty size C calculated in step ST22 is compared with file size DFS (the size required for creation) designated by the command. If size DFS required for creation is larger than empty size C (YES in step ST24), response data indicating a file size error is output (step ST26), and the control returns to a command wait state (START in FIG. 7A).

If the calculated empty size is normal (NO in step ST24), it is checked if the command requests creation of a data file. If the command requests creation of a data file (YES in step ST28), a minimum value of sequence numbers which are not currently used by other data files is calculated (step ST32). At this time, if an unused sequence number is not found (YES in step ST34), response data indicating an error of the number of files is output (step ST36), and the control returns to a command wait state (START in FIG. 7A). Otherwise (NO in step ST34), the control enters definition information preparation processing (step ST40) shown in FIG. 10.

On the other hand, when the command requests creation of a file (e.g., area file) other than a data file (NO in step ST28), the leading address of the area file of data EF (data in a definition information field) to be currently created is calculated on the basis of the file size designated by the command and the area group leading address stored in control area 120 in FIG. 3 (step ST30), and the control enters definition information preparation processing (step ST40) shown in FIG. 10. Examples of the above calculated leading address are ATOP of FIG. 4C and KTOP of FIG. 4D.

If a target of the definition information preparation processing (step ST40) in FIG. 10 is data file creation, the data file is prepared using PTN indicating a data file pattern, file sequence number DFSN searched for in the previous processing, file sequence number PFSN of a parent file of the file, length NL of the data file name designated by the command, the data file name, file size DFS, area access identification number AID for specifying data EF for storing data to be output upon selection of this file, and access condition DFAC, as shown in FIGS. 4A to 4C. Note that data file status DFST, and used size US are respectively set to be predetermined initial values. Note that dummy data DMY is inserted in step ST40, so that the data file definition field (FIGS. 4A to 4D) has a fixed size or a constant length of 19 bytes. The dummy data insertion processing will be described in detail later with reference to FIG. 17.

On the other hand, when a processing target in the processing in step ST40 is a data area, a data area is prepared using PTN indicating a data area pattern, file sequence number DFSN of a parent file of the file, area access identification number AID designated by the command, area access condition AAC, and area leading address ATOP calculated in the previous processing. Note that data area status AST is set to be an initial value.

If a processing target is a key area, a key area is prepared using PTN indicating a key area pattern, file sequence number DFSN of a parent file of the file, key area identification number KID designated by the command, key area size KSIZ, key area identification bit BS, key area access condition KAC, and key area leading address KTOP calculated in the previous process. Note that key area status KST is set to be a predetermined initial value.

Definition information prepared in step ST40 is stored in directory 121 to have, as a target, an area from a directory pointer (empty area leading address) stored in control area 120 to an address immediately before the area group leading address to be updated by the current file creation (step ST42). At this time, if writing of definition information is not successfully completed (NO in step ST44), response data indicating a writing error is output (step ST46), and the control returns to a command wait state (START in FIG. 7A).

When the writing of definition information is successfully completed (YES in step ST44), the used sizes of all data files from a file looked up in the current file size checking operation to the current file are updated (step ST48). Upon updating, of the above-mentioned data file management information definition word (FIG. 4B), a US part is updated, and BCC2 is calculated from values DFST and US, thus simultaneously updating BCC2. At this time, if updating of US and BCC2 is not successfully completed (NO in step ST50), response data indicating a writing error is output (step ST46), and the control returns to a command wait state (START in FIG. 7A).

If updating of US and BCC2 is successfully completed (YES in step ST50), the directory pointer and the area group leading address stored in area 120 in FIG. 3 are updated (step ST52). If updating is not successfully completed (NO in step ST54), response data indicating a writing error is output (step ST46), and the control returns to a command wait state (START in FIG. 7A). On the other hand, if updating is successfully completed (YES in step ST54), response data indicating successful completion is output (step ST56), and the control returns to a command wait state (START in FIG. 7A).

A data file selection operation for setting a data file in a current state will be described below with reference to the flow chart shown in FIG. 11.

Figure 11:
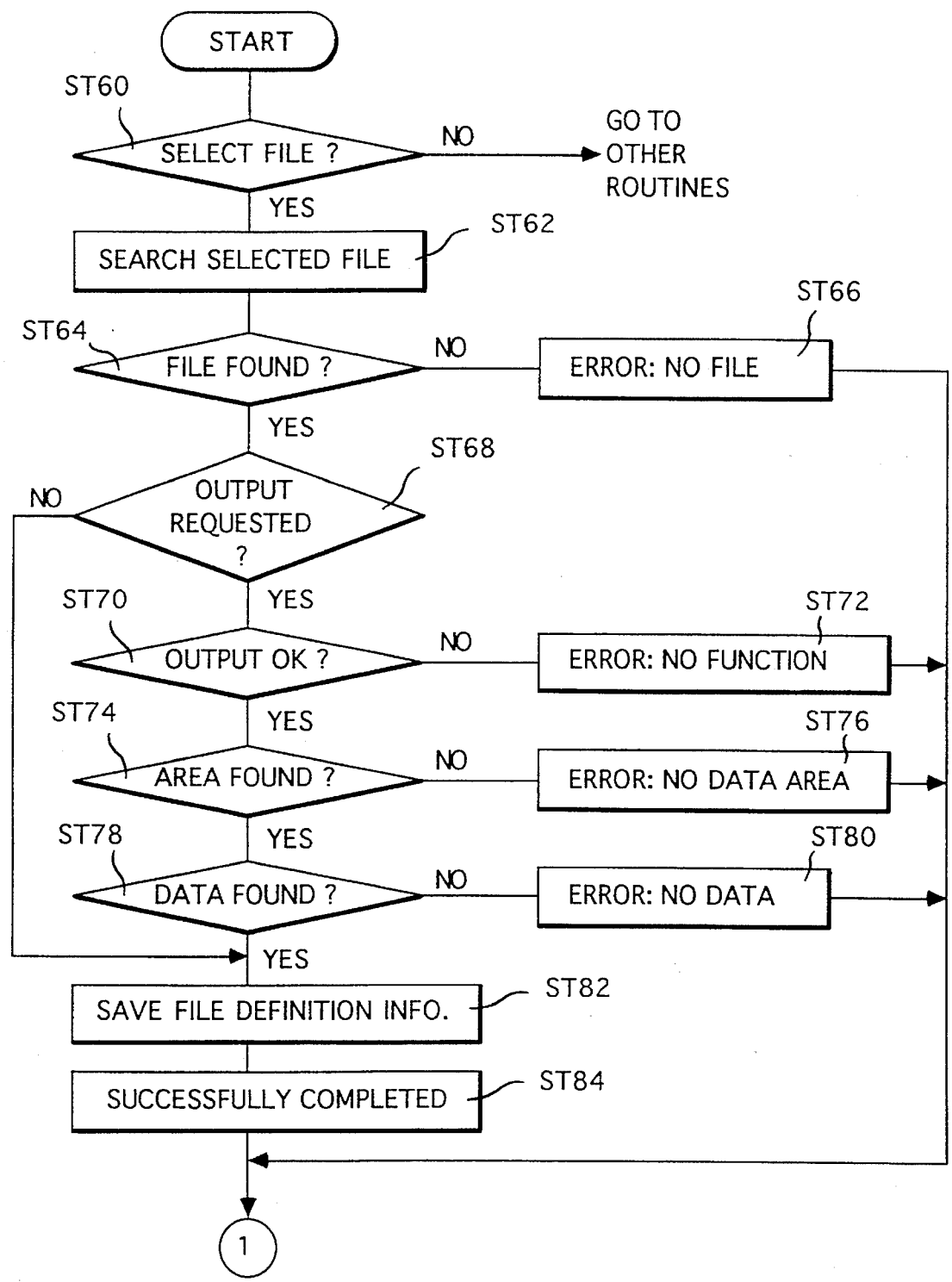
FIG. 11 is a flow chart for explaining a data file selection operation.
Figure 12:
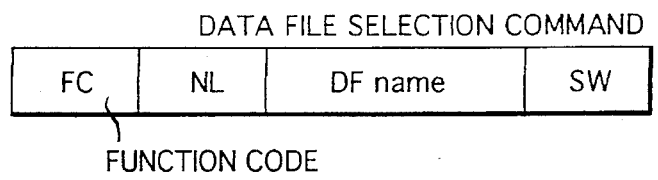
FIG. 12 shows the format of a data file selection command.

Upon reception of a data file selection command, as shown in FIG. 12, CPU 11 in FIG. 2 confirms based on function code FC in the command that the received command is a data file selection command (YES in step ST60), and processing shown in the flow chart in FIG. 11 is executed.

Data file name information informed by this command is extracted, and directory 121 is searched (step ST62) to check if the designated data file already exists. If the designated data file does not exist (NO in step ST64), response data indicating the absence of the corresponding data file is output (step ST66), and the control returns to a command wait state (START in FIG. 7A).

If the designated data file exists (YES in step ST64), it is checked based on an SW part (FIG. 12) in the command if the command requests output of file addition information. If output of information is not requested (NO in step ST68), data file definition information having the corresponding data file name is stored at the predetermined position in working memory 13 in FIG. 2 (step ST82), and response data indicating successful completion is output (step ST84). Thereafter, the control returns to a command wait state (START in FIG. 7A).

If output of file addition information is requested (YES in step ST68), data TYPE of the data file is checked. If this TYPE does not permit an output function (NO in step ST70), response data indicating no output function is output (step ST72), and the control returns to a command wait state (START in FIG. 7A).

On the other hand, if TYPE permits an output function (YES in step ST70), it is checked if a data area having AID indicated by AAID assigned to the current file exists under the current file. If such a data area does not exist (NO in step ST74), response data indicating the absence of the corresponding data area is output (step ST76), and the control returns to a command wait state (START in FIG. 7A).

On the other hand, if such a data area exists (YES in step ST74), it is checked to see if outputtable data is present in the data area. If such data does not exist (NO in step ST78), response data indicating the absence of the corresponding data is output (step ST80), and the control returns to a command wait state (START in FIG. 7A).

On the other hand, if the data exists (YES in step ST78), definition information of the current data file is stored at the predetermined position in working memory 13 (step ST82), and response data indicating successful completion is output together with file addition information (step ST84).

With the above-mentioned processing, information of the current data file looked up by all the above-mentioned commands can be confirmed at the time of execution of commands.

A reading/writing/erasing operation of a record with respect to a data area will be described below with reference to the flow chart shown in FIG. 13.

FIG. 14A shows a record writing command, FIG. 14B shows a record reading command, FIG. 14C shows a record erasing command, FIG. 14D shows a key identification command, and FIG. 14E shows a key unlock command.

Figure 13:
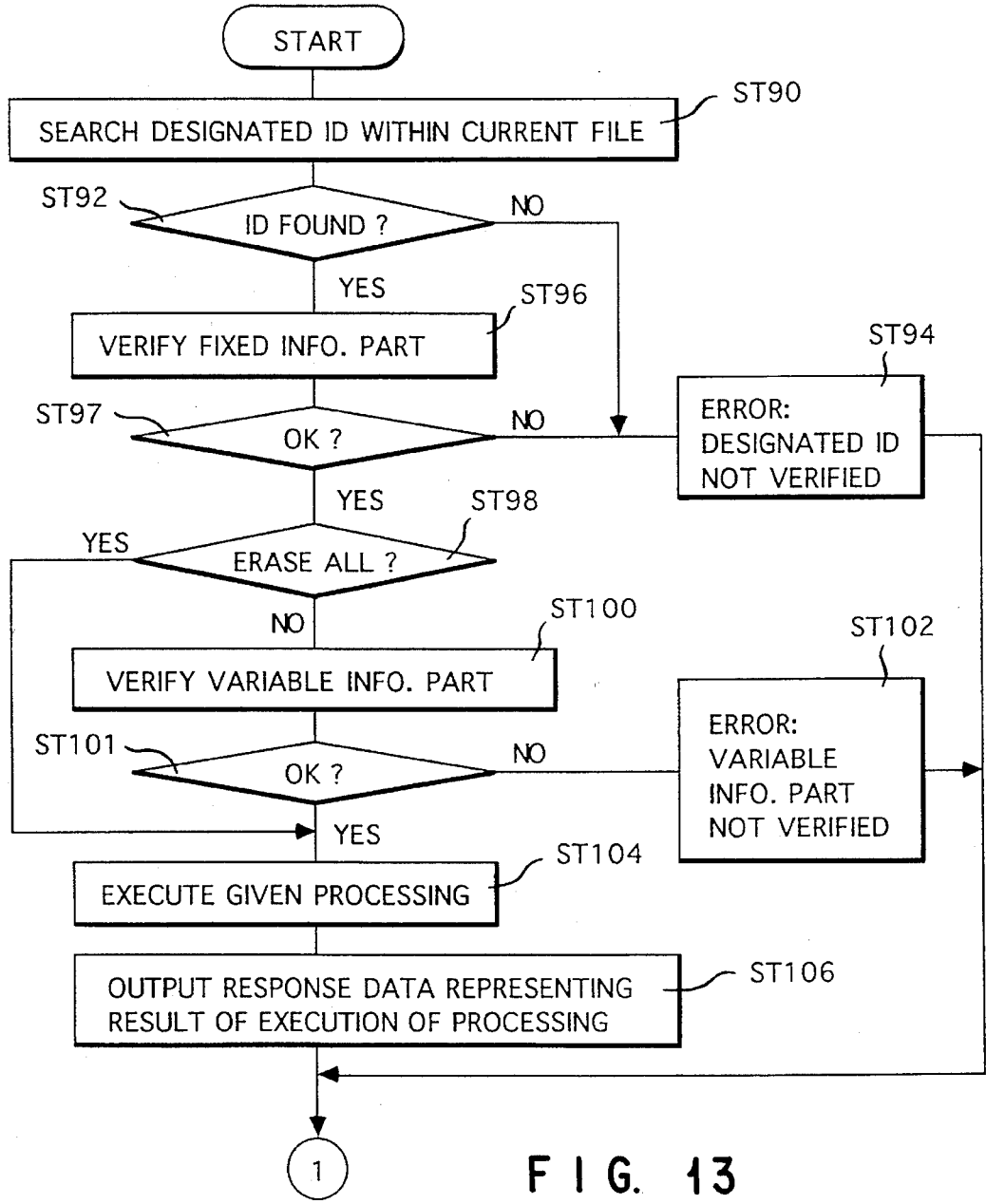
FIG. 13 is a flow chart for explaining a record reading/writing/erasing operation.

CPU 11 of IC card 1 determines, by extracting function code FC, which of the record recording command, record writing command, and record erasing commands shown in FIGS. 14A to 14C is input, and processing shown in the flow chart of FIG. 13 is executed.

From input command statements (one of FIGS. 14A to 14E), an area ID (identification information) designated as an access target is extracted, and it is checked if definition information having the extracted ID is present in data areas belonging to the current data file (step ST90). At this time, if definition information is not found (NO in step ST92), response data indicating the absence of the designated ID is output (step ST94), and the control returns to a command wait state (START in FIG. 7A).

When the definition information is found by the above-mentioned search operation (YES in step ST92), authenticity of a fixed information part of the data file is verified on the basis of data BCC1 (see FIGS. 4B to 4D) in the found definition information (step ST96). If it is determined that the fixed length information part is abnormal (NO in step ST97), response data indicating the absence of the designated ID is output (step ST94), and the control similarly returns to a command wait state (START in FIG. 7A).

If the authenticity is verified by the above-mentioned checking operation (YES in step ST97), it is checked based on function code FC in the input command statement and parameters attached thereto if the input command requests to erase all records in the data area. If it is determined that the command requests to erase all records (YES in step ST98), the flow advances to step ST104 for executing the corresponding processing.

On the other hand, if it is determined that the command does not request to erase all records (NO in step ST98), authenticity of a variable information part of the data file is verified on the basis of data BCC2 in the previously found definition information (step ST100). If it is determined that the variable information part is abnormal (NO in step ST101), response data indicating a variable part error is output (step ST102), and the control returns to a command wait state (START in FIG. 7A).

If it is determined that authenticity is verified (YES in step ST101), the flow advances to step ST104 of executing processing designated by the command statement.

Figure 15:
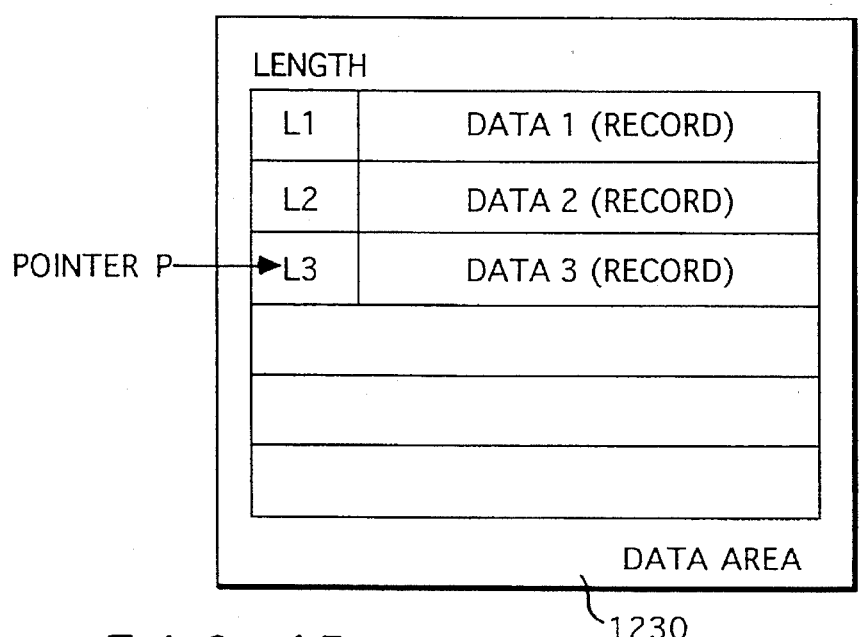
FIG. 15 is a view showing a storage state of records.

A state wherein records are stored in data area 1230 assured in area group 123 in memory 12 of IC card 1 will be described below with reference to FIG. 15. As shown in FIG. 15, records (DATA1 to DATA3) are additionally written in data area 1230 each time a recording writing command (FIG. 14A) is received. In this example, writing processing is executed in the order of record 1 (constituted by length data L1 and data 1), record 2 (constituted by length data L2 and data 2), and record 3 (constituted by length data L3 and data 3). Note that in IC card 1, CPU 11 recognizes record number RN, and number RN corresponds to the recording writing order (the data arrangement order in FIG. 15).

Furthermore, IC card 1 has information of pointer P for each data area 1230, as shown in FIG. 15, and upon access from an external device (controller 3 in FIG. 1), the stored location of records in data area 1230 can be internally recognized by pointer P. The information of pointer P is stored in an AST part in the corresponding data area definition information (FIG. 4C).

The information of pointer P is updated when the record writing command (FIG. 14A) is successfully completed. In particular, at the time of creation of data area 1230, pointer P is stored in the AST part as an initial state (having a value '0000' indicating the presence of no records). Also, pointer P is set in the initial state ('0000') when the command (FIG. 14C) for requesting to simultaneously erase records in data area 1230 is successfully completed.

Upon updating of the information of pointer P, the value of data BCC2 (FIGS. 4A to 4D) is simultaneously changed accordingly.

Figure 16:
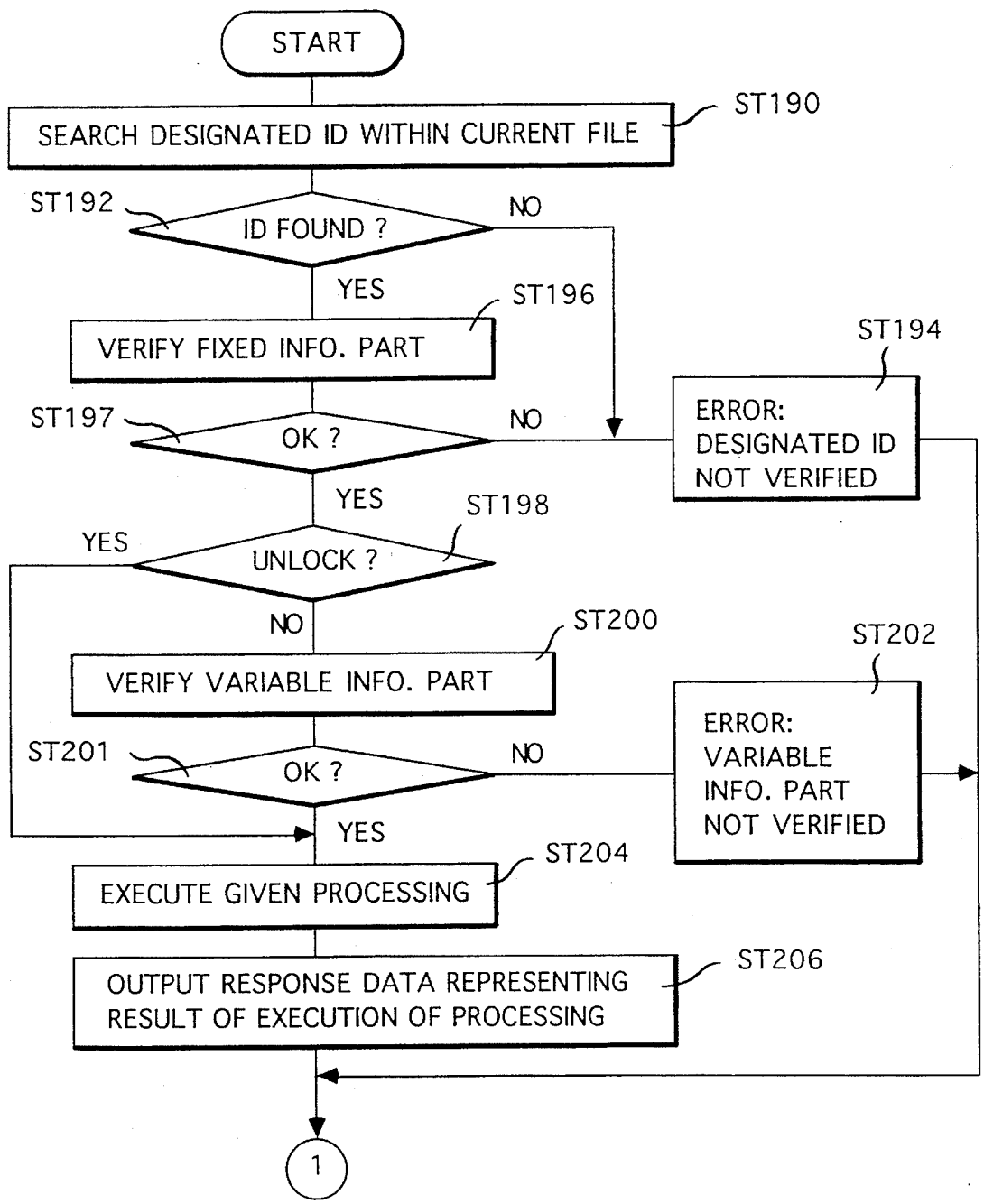
FIG. 16 is a flow chart for explaining a key unlock operation.

CPU 11 of IC card 1 determines, by extracting function code FC, which of the key identification command shown in FIG. 14D and the key unlock command (for unlocking a key lock state) shown in FIG. 14E is input, and processing shown in the flow chart in FIG. 16 is executed.

From the input command statement (FIG. 14D or 14E), a key area ID designated as an access target is extracted, and it is checked if definition information having the extracted ID is present in key areas belonging to the current data file (step ST190). If definition information is not found (NO in step ST192), response data indicating the absence of the designated ID is output (step ST194), and the control returns to a command wait state (START in FIG. 7A).

On the other hand, if definition information is found (YES in step ST192), authenticity of a fixed information part is verified on the basis of data BCC1 in the found definition information (step ST196). If it is determined that the fixed information part is abnormal (NO in step ST197), response data indicating the absence of the designated ID is output (step ST194), and the control similarly returns to a command wait state (START in FIG. 7A).

If it is determined that authenticity is verified (YES in step ST197), it is checked based on function code FC in the input command statement and parameters attached thereto if the command requests to unlock the corresponding key. If it is determined that the command requests to unlock the current key (YES in step ST198), the flow advances to step ST204 of executing the corresponding processing.

If it is determined that the command does not request to unlock the current key (NO in step ST198), authenticity of a variable information part is verified on the basis of data BCC2 in the previously found definition information (step ST200). If it is determined that the variable information part is abnormal (NO in step ST201), response data indicating a variable length part error is output (step ST202), and the control returns to a command wait state (START in FIG. 7A).

If it is determined that authenticity is verified (YES in step ST201), the flow advances to step ST204 of executing processing designated by the command statement.

In key identification processing (step ST204), a KST part in FIG. 4D is looked up to check if the key is locked. If it is determined that the key is locked, response data indicating that the key is already locked is output (step ST206), and the control returns to a command wait state (START in FIG. 7A).

If it is determined that the key is not locked, key data for identification included in the command statement (FIG. 14D) is identified with key data indicated by the ID designated by the command to check if the two data coincide with each other. If the two data coincide with each other, response data indicating the coincidence of keys is output (step ST206), and the control returns to a command wait state (START in FIG. 7A).

On the other hand, if it is determined that the two key data do not coincide with each other, the contents of the KST part in FIG. 4D are updated to indicate that "key is locked", and the value of data BCC2 is also changed. Thereafter, response data indicating the non-coincidence of keys is output (step ST206), and the control returns to a command wait state (START in FIG. 7A).

Figure 17:
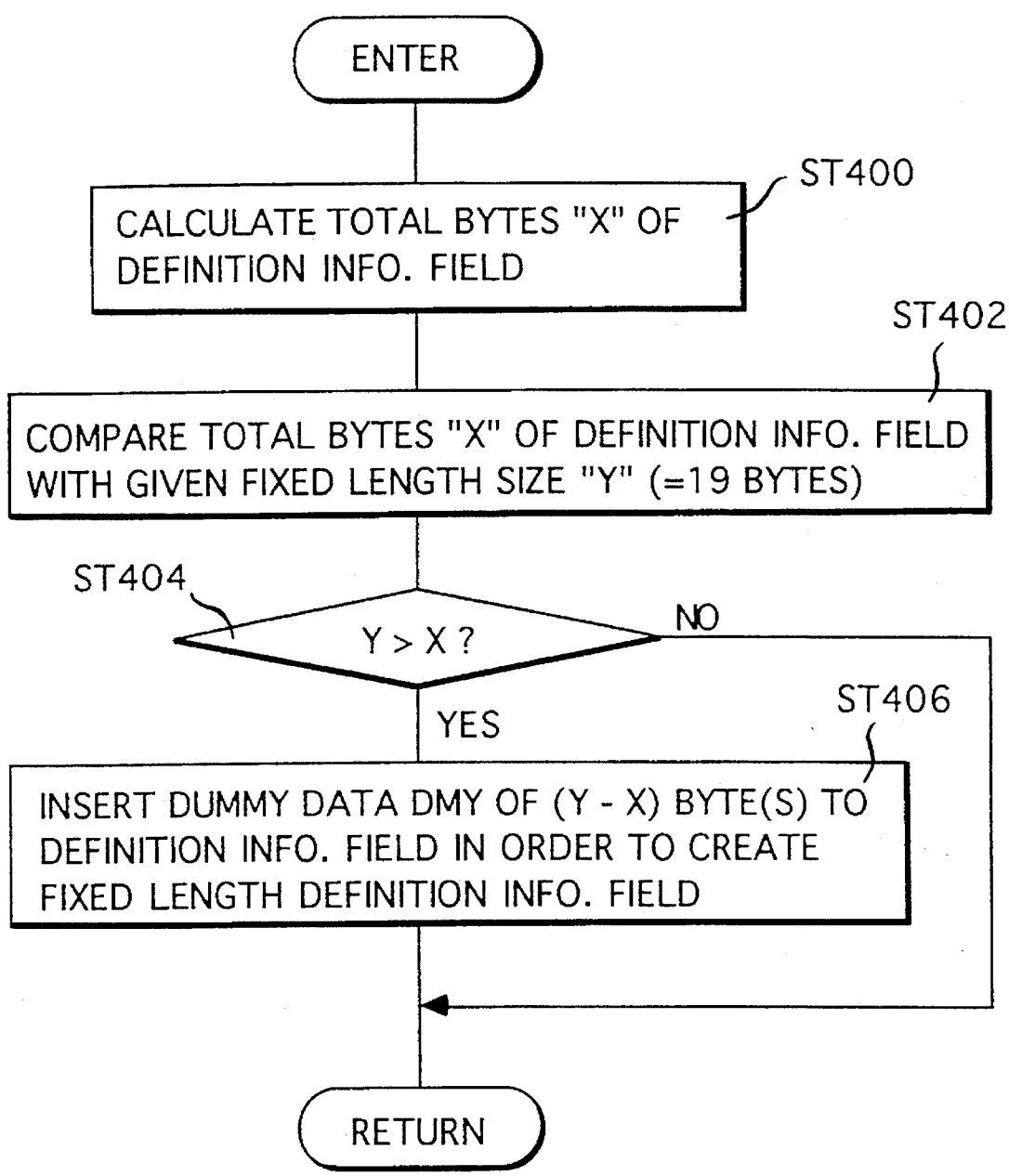
FIG. 17 is a flow chart for explaining a dummy data insertion operation for keeping a definition information field to be a fixed length (or a constant size).

FIG. 17 is a flow chart for explaining how to insert dummy data DMY so as to keep the data size of definition information field (FIGS. 4A to 4D) to be a predetermined fixed length. This dummy data insertion processing is executed in definition information preparation step ST40 in FIG. 10.

CPU 11 of IC card 1 calculates total number X (in FIG. 4A, X=7 to 14 bytes) of bytes of data written in a definition information field prepared in step ST40 in FIG. 10 (step ST400). Calculated number X of bytes is compared with predetermined fixed size (19 bytes in this case) (step ST402).

If calculated number X of bytes is smaller than predetermined fixed size Y (YES in step ST404), dummy data DMY (in FIG. 4A, DMY=5 to 12 bytes) having a size corresponding to the difference (Y−X) between the two values is inserted in a definition information field prepared in step ST40 (step ST406). In this manner, the definition information field having a fixed length of 19 bytes is prepared by CPU 11.

If calculated number X of bytes is equal to predetermined fixed size Y (NO in step ST404), as shown in FIG. 4B, dummy data insertion step ST406 is skipped, and the control returns to the processing shown in FIG. 10.

Since the size of the definition information field is fixed to 19 bytes, definition information whose total number X of bytes for one field exceeds 19 bytes is not prepared.

In the above embodiment, an IC card (memory card) has been exemplified as a device to be subjected to file management. However, the housing shape is not limited to a card shape, but various other shapes such as a rod shape, block shape, and the like may be adopted. The device is not limited to a portable electronic device. In addition, the contents of the arrangement can be modified within the spirit and scope of the invention.

The IC card exemplified in the above embodiment uses a contact unit for exchanging data with an external device. For example, a non-contact data exchange method using light, an electric field, a magnetic field or the like may be adopted.

As described above, according to the file management system of the present invention, data in a directory are managed using fixed fields. For this reason, even if some data fields in a directory are destroyed, since fields after the destroyed fields can be accessed, the destroyed fields do not influence other definition information, and the reliability of the system can be remarkably improved.

According to the present invention, fixed information in a directory can be accessed as a target upon only creation of a file. For this reason, a file management system which can assure authenticity of fixed information even when variable information is destroyed by, e.g., unexpected removal of a card upon changing of variable information can be provided.

Furthermore, according to the present invention, even when an inadvertent accident occurs, a variable information part can be recovered. For this reason, a file management system which can assure a normal operation of the IC card after the accident can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A file management system for managing a plurality of files in a memory, based on directory information defining the files in the memory, the system comprising:

means for storing the directory information which includes fixed data which remains unchanged despite any change in the files and variable data which is dependent on a change in the files, wherein the fixed data contains file identification information, file size information, and first check information for checking validity of the fixed data, and wherein the variable data contains unused file size information indicating unused size of any of the files in the memory, and second check information for checking validity of the variable data;

means for searching the directory information of a target file which is to be accessed, based on the file identification information;

first verify means for verifying the validity of the fixed data included in the directory information searched by the searching means, based on the first check information contained in the fixed data;

second verify means for verifying the validity of the variable data included in the directory information searched by the searching means, based on the second check information contained in the variable data;

means for erasing data of the target file when the first verify means verifies the validity of the fixed data; and means for accessing the target file when the first verify means verifies the validity of the fixed data and the second verify means verifies the validity of the variable data.

2. The system of claim 1, further comprising:

means for updating the unused file size information of the variable data when the unused size of any of the files is changed by the accessing means.

3. A file management system for managing a plurality of files in a memory, based on directory information defining the files in the memory, the system comprising:

means for storing the directory information which includes fixed data which remains unchanged despite a change in the files and variable data which is dependent on a change in the files, wherein the fixed data contains file identification information, file address information, file size information, and first check information for checking validity of the fixed data, and wherein the variable data contains end address information indicating an end of data in any of the files in the memory, and second check information for checking validity of the variable data;

means for searching the directory information of a target file which is to be accessed, based on the file identification information;

first verify means for verifying the validity of the fixed data included in the directory information searched by the searching means, based on the first check information contained in the fixed data;

second verify means for verifying the validity of the variable data included in the directory information searched by the searching means, based on the second check information contained in the variable data;

means for erasing data of the target file in accordance with the fixed data when the first verify means verifies the validity of the fixed data; and means for accessing the target file when the first verify means verifies the validity of the fixed data and the second verify means verifies the validity of the variable data.

4. An IC card in which a plurality of files are managed based on directory information defining the files, the IC card comprising:

a memory having a directory area for storing the directory information, and a data area defined by the directory information, wherein the directory information includes file definition information for defining any of the files and area definition information for defining one or more areas depending on any of the files defined by the file definition information, wherein the file definition information includes a pattern indicating the file definition information, a file number, and file size information, and wherein the area definition information includes another pattern indicating the area definition information, another file number of a parent file on which one or more files defined by the directory information depends, area identification information, area address information, and area size information, wherein each of the file definition information and the area definition information is stored with a predetermined data size in the memory, and wherein the file definition information includes fixed data which remains unchanged despite any change in the files and variable data which is dependent on a change in the files, wherein the fixed data contains file identification information, file size information, and first check information for checking a validity of the fixed data, and wherein the variable data contains unused file size information indicating a free area or unused size of any of the files, and second check information for checking a validity of the variable data;

means for searching the file definition information of a target file and the area definition information of a target area from the directory information sorted in the directory area of the memory, based on the file number and the area definition information when the target file is to be accessed;

means for accessing the target area of the target file based on the file definition information of the target file and on the area definition information of the target area;

means for searching the directory information of the target file based on the file identification information when the target file is to be accessed;

a first verify means for verifying, based on first check information, the validity of the fixed data of the directory information searched by the searching means;

a second verify means for verifying, based on second check information, the validity of the variable data of the directory information searched by the searching means;

means for erasing data of the target file when the first verify means verifies the validity of the fixed data; and means for accessing the target file when the first verify means verifies the validity of the fixed data and the second verify means verifies the validity of the variable data.

5. An IC card in which a plurality of files are managed based on directory information defining the files, the IC card comprising:

a memory having a directory area for storing the directory information, and a data area defined by the directory information, wherein the directory information includes file definition information for defining any of the files and area definition information for defining one or more areas depending on any of the files defined by the file definition information, wherein the file definition information includes a pattern indicating the file definition information, a file number, and file size information, and wherein the area definition information includes another pattern indicating the area definition information, another file number of a parent file on which one or more files defined by the directory information depends, area identification information, area address information, and area size information, wherein each of the file definition information and the area definition information is stored with a predetermined data size in the memory, wherein the file definition information includes fixed data which remains unchanged despite any change in the files and variable data which is dependent on a change in the files, wherein the fixed data contains area identification information, area address information, area size information, and first checking information for check validity of the fixed data, and wherein the variable data contains end address information indicating an end of data in the data area, and second check information for checking validity of the variable data;

means for searching the file definition information of a target file and the area definition information of a target area from the directory information sorted in the directory area of the memory, based on the file number and the area definition information when the target file is to be accessed;

means for accessing the target area of the target file based on the file definition information of the target file and on the area definition information of the target area;

means for searching the directory information of the target area based on the area identification information when the target area is to be accessed;

a first verify means for verifying, based on first check information, a validity of the fixed data of the directory information searched by the searching means;

a second verify means for verifying, based on second check information, a validity of the variable data of the directory information searched by the searching means;

means for erasing data of the target area based on the fixed data when the first verify means verifies the validity of the fixed data; and means for accessing the target area based on the fixed data and on the variable data when the first verify means verifies the validity of the fixed data and the second verify means verifies the validity of the variable data.

* * * * *